(12) United States Patent
Tymes

(10) Patent No.: US 7,433,370 B1
(45) Date of Patent: Oct. 7, 2008

(54) DATA STRUCTURES WITH AMORTIZED CONTROL OVERHEAD AND METHODS AND NETWORKS USING THE SAME

(76) Inventor: LaRoy Tymes, 2941 Boeing Rd., Cameron Park, CA (US) 95682

( * ) Notice: Subject to any disclaimer, the term of this patent is extended or adjusted under 35 U.S.C. 154(b) by 1063 days.

(21) Appl. No.: 10/361,246

(22) Filed: Feb. 10, 2003

(51) Int. Cl.
*H04J 3/00* (2006.01)
(52) U.S. Cl. ...................................... 370/474; 370/498
(58) Field of Classification Search ................. 370/336, 370/345, 349, 470–476, 498, 496
See application file for complete search history.

(56) References Cited

U.S. PATENT DOCUMENTS

| 5,282,207 | A * | 1/1994 | Jurkevich et al. ............ 370/468 |
| 6,438,137 | B1 * | 8/2002 | Turner et al. ................. 370/466 |
| 6,512,751 | B1 * | 1/2003 | Struhsaker et al. .......... 370/329 |
| 6,618,397 | B1 * | 9/2003 | Huang .......................... 370/474 |
| 6,721,334 | B1 * | 4/2004 | Ketcham ...................... 370/473 |
| 6,970,940 | B1 * | 11/2005 | Vogel et al. .................. 709/236 |
| 2002/0122413 | A1 * | 9/2002 | Shoemake ................... 370/349 |

* cited by examiner

*Primary Examiner*—Wing F. Chan
*Assistant Examiner*—Saba Tsegaye
(74) *Attorney, Agent, or Firm*—James J. Murphy; Thompson & Knight LLP

(57) ABSTRACT

A method and data structure for transmitting data in a networked system having a shared transmission medium that includes generating a plurality of virtual packets each containing information for delivery to at least one selected terminal in the networked system via the shared medium and generating a map field having control information for controlling the delivery of the virtual packets. The method and data structure also include forming a physical packet for transmission across the shared transmission medium, the physical packet including a control field and the plurality of virtual packets such that overhead associated with the control field and medium access is amortized over the plurality of virtual packets.

29 Claims, 4 Drawing Sheets

DATA STRUCTURES WITH AMORTIZED CONTROL OVERHEAD AND METHODS AND NETWORKS USING THE SAME

FIELD OF INVENTION

The present invention relates in general to networked systems and, in particular, to data structures with amortized control overhead and methods and networks using the same.

BACKGROUND OF INVENTION

Hard-wired local area networks (LANs) have developed significantly since the inception of the Ethernet over two decades ago. Today, hard-wired LANs which are relatively inexpensive, fast, and reliable are widely available for both private and public applications. Businesses, educational institutions, governmental, and other public entities have all significantly benefited from the ability of hard-wired LANs to electronically exchange information between physically separated network terminals. However, hard-wired LANs are clearly subject to the constraints imposed by the required physical infrastructure, and, in particular, to limitations on the mobility of individual network terminals as a consequence of the immediate availability or unavailability of the appropriate physical interconnect.

In view of the limitations on hard-wired LANs, as well as significant advances in wireless communication technologies, the development of standardized wireless LANs (WLANs) has been the next logical step. One particular standard which defines protocols for WLANs is ANSI/IEEE Std. 802.11 *Wireless LAN Medium Access Control and Physical Layer Specifications*. This standard is one of the ANSI/IEEE 802 family of standards applicable to both local and metropolitan area networks. Additionally, ANSI/IEEE Std. 802.11 is associated with a number of released, and proposed (draft) supplemental standards, including draft supplemental standard ANSI/IEEE Std. 802.11e *MAC Enhancements for Quality of Service*.

Quality of service (QoS) considerations are critical for supporting multimedia (audio/video) applications, which require increased control over transmission rates, latency, and error rates. QoS over a WLAN presents considerable challenges since changes in the wireless medium may significantly affect each of these parameters and consequently the quality of the presentation at the receiving terminal. In addition, different data categories require different priorities and different transmission strategies. For example, voice transmissions are more tolerant to latencies and data errors than multimedia transmissions in which data errors and latency are able to impede generation of a smooth, high quality presentation. On the other hand, text and relatively static display data have an even higher tolerance to errors and latency and therefore typically do not require the utilization of complex QoS mechanisms.

Even in view of draft supplementary standard ANSI/IEEE Std. 802.11e, many problems remain to be resolved with respect to the actual implementation of QoS principles in WLAN systems. Addressing these problems in a cost efficient manner has become a priority in the WLAN industry since consumers increasingly expect information processing systems to both support high-quality multimedia applications and provide the higher degree of convenience afforded by wireless communications.

SUMMARY OF INVENTION

One representative embodiment of the principles of the present invention is a method of transmitting data in a networked system including a shared transmission medium, which includes generating a plurality of virtual packets each containing information for delivery to at least one selected terminal in the networked system via the shared medium and generating a map field having control information for controlling the delivery of the virtual packets. The method also includes forming a physical packet for transmission across the shared transmission medium, the physical packet including a control field and the plurality of virtual packets such that overhead associated with the control field and medium access is amortized over the plurality of virtual packets.

By containerizing virtual packets and associated control information in a single physical packet for transmission over a network shared medium, the time overhead required to transmit data from one terminal to one or more other terminals on the network is substantially reduced. Furthermore, the principles of the present invention allow the physical packet to be structured with redundant map fields as required to ensure proper transmission of the physical frame in noisy network environments. In some embodiments of the inventive principles, the map field includes information indicating not only the target receiving terminal, but also information for allowing the receiving terminal to reconstruct larger data structures formed by the individual virtual packets. Additionally, the data rates within each virtual packet may differ, depending on the data protocol of the networked system in which the principles of the present invention are applied. Finally, the principles of the present invention are applicable to system environments including terminals, which are not responsive to the inventive packetizing protocol. Consequently, these principles may be utilized in systems including legacy and other non-compatible terminals without adversely impacting the operation of those legacy and other terminals.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-5 of the drawings, in which like numbers designate like parts.

Figure 1:
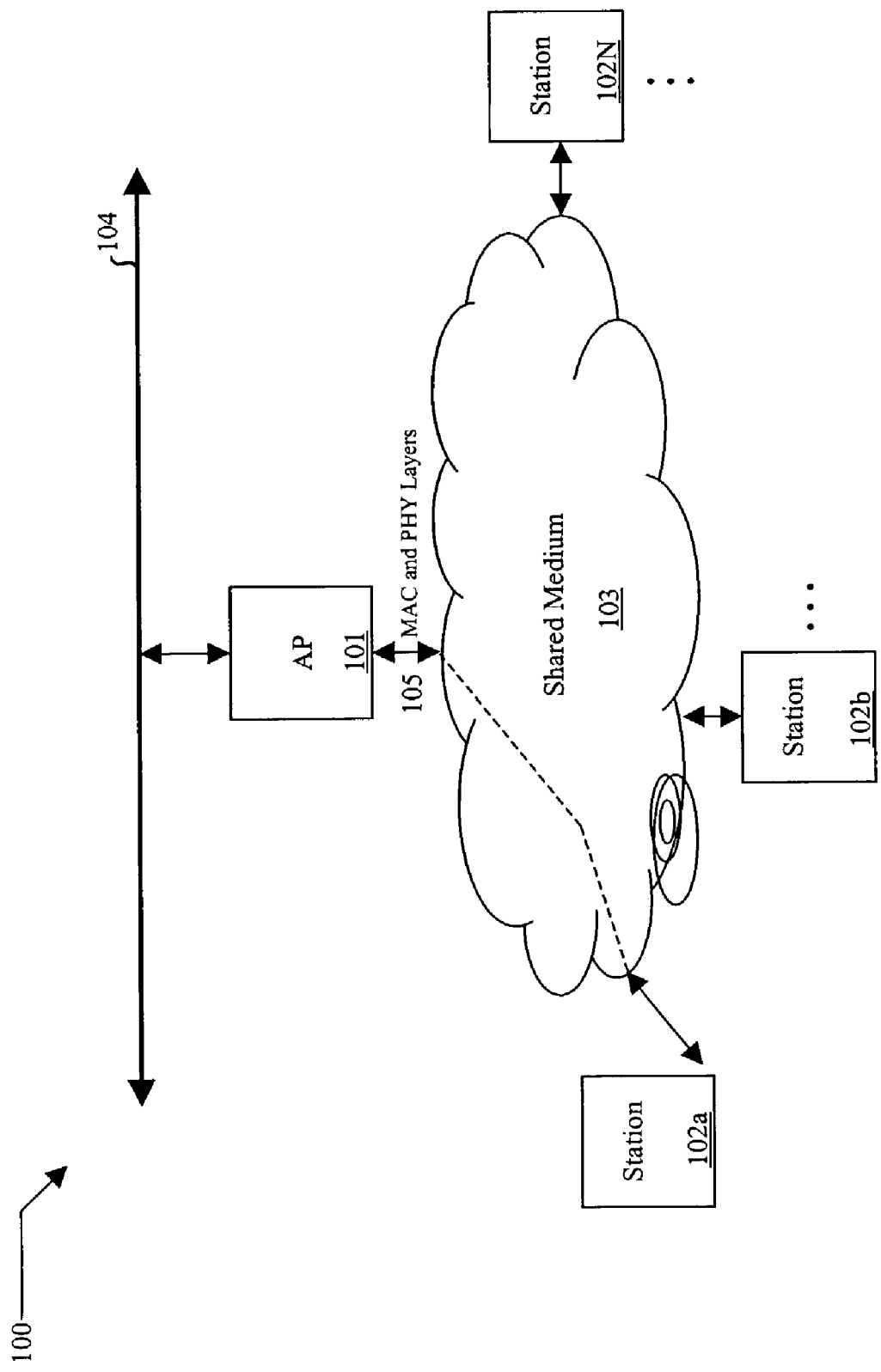
FIG. 1 is a high level block diagram of a representative Basic Service Set (BSS) within an ANSI/IEEE Std. 802.11 wireless local area network (WLAN)

FIG. 1 is a high level block diagram of a Basic Service Set (BSS) 100 forming a portion of an infrastructure WLAN in accordance with ANSI/IEEE Std. 802.11 (hereafter the "802.11 standard"). BSS 100 includes an Access Point (AP) 101 that is in wireless communication with a set of N number of information processing terminals or stations 102a,b . . . N through a wireless (shared) medium 103 (e.g., "air" is the shared medium). N is an integer greater than or equal to one (1). AP 101 also provides a connection to an associated hard-wired infrastructure 104, such as a hard-wired, local area network LAN.

The physical (PHY) layer specified by the 802.11 standard defines the signaling and interface techniques for wireless information exchange between AP 101 and stations 102a,b . . . N via shared medium 103, such as by direct sequence spread spectrum, frequency-hopping spread spectrum, or infrared (IR) pulse modulation. The 802.11 standard also specifies a Medium Access Control (MAC) layer, which is the primary focus of the present discussion, defining the protocols for the orderly exchange of data between AP 101 and stations 102a,b . . . N using the PHY layer. The MAC layer essentially includes both firmware and hardware that controls timing, transmit state machines, and receive state machines.

The basic 802.11 standard MAC protocol is a Distributed Coordination Function (DCF) scheme (e.g., "listen-before talk" scheme) based on Carrier Sense Multiple Access (CSMA). Data are exchanged as MAC Service Data Units (MSDUs) of up to 2304 bytes in length. DCF accesses to the shared medium generally provide the lowest latency for burst accesses.

Figure 2A:
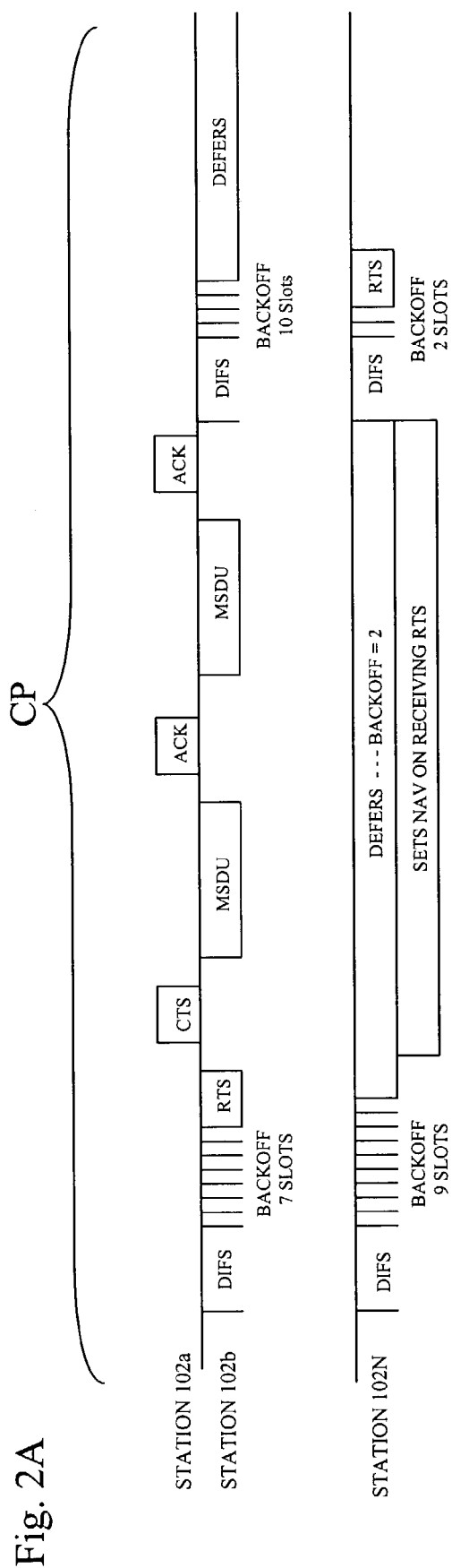
FIG. 2A is a diagram of an exemplary Distributed Coordination Function (DCF) access across the wireless medium shown in FIG. 1.

An exemplary DCF access is shown in FIG. 2A. Generally, DCF accesses are performed during a contention period (CP). A given station 102a,b . . . N transmits MSDUs only after sensing that a channel across shared medium 103 is available (e.g., no other station 102a,b . . . N is transmitting across that channel). However, if two or more stations 102a,b . . . N simultaneously sense a channel across the shared medium as being free, a collision may occur. Therefore, the 802.11 standard also implements collision avoidance (CA) mechanism at the MAC layer.

In particular, to minimize the probability of collisions, each station 102a,b . . . N attempting to access the channel first waits until the transmission channel remains clear for a time period referred to as the DCF Interframe Space (DIFS) and then for an additional random backoff period defined in a number of transmission slot times. If the channel remains clear through both the DIFS and the additional random period, the corresponding transmitting station 102a transmits its data.

In the example shown in FIG. 2A, station 102a and station 102N both sense the same channel across shared medium 103 as being clear after the DIFS period. Station 102a then waits for seven (7) back-off slots and station 102N for nine (9) back-off slots. Since station 102a detects a channel clear condition two (2) slots prior to station 102N reaching the end of its backoff period, station 102a therefore detects the channel as free and is granted the transmission rights. Station 102N detects a channel busy condition and holds-off its transmission.

A successful transmission from station 102a is acknowledged with an acknowledge frame (ACK) by the receiving station 102 b in FIG. 2A, while an unsuccessful transmission remains unacknowledged. The backoff value for the transmitting station 102 increases with each successive failure (up to a maximum value). The transmitting station 102 then monitors the channel through the new backoff period and then retransmits. After a successful transmission, the transmitting station 102a has a new random backoff period.

Any stations 102a,b . . . N, which must defer from accessing the channel during transmission by another station 102a,b . . . N, continue to count down from the value of their backoff values remaining at the time of deferral after sensing the channel as free following the next DIFS period. For example, station 102N continues to countdown from two (2) during the second DIFS period shown in FIG. 2A. Since the probability that two stations 102a,b . . . N having the same random backoff period is small, the probability of packet collisions on the channel is correspondingly small.

The inherent problem of hidden stations in CSMA systems is minimized using a Request-to-Send/Clear-to-Send (RTS/CTS) mechanism. Hidden stations are those stations 102c,d . . . N, which are not within the communications region of the transmitting station 102a but are nonetheless within the communications region of the target receiving station 102b. The hidden station problem typically occurs because the transmitting station 102a cannot detect a concurrent transmission from a hidden station to the target receiving station 102b. To avoid a collision, the transmitting station 102a therefore sends an RTS frame at the beginning of the transmission and after Short Interframe Space (SIFS) period, the receiving station 102b returns a CTS frame. In FIG. 2A, granted transmitting station 102a sends the RTS frame and receiving station 102b returns the CTS frame. The RTS and CTS frames carry data, which indicate to hidden stations 102c,d . . . N the time period required for transmission of the following data frame such that the hidden stations 102c,d . . . N can hold-off any attempts to transmit data. Specifically, any deferring station (in FIG. 2A, station 102N) sets a timer (Network Allocation Vectors or NAVs), which hold-off attempts to transmit during the expected transmit time for the current frame on the channel by the transmitting station 102a.

Figure 2B:
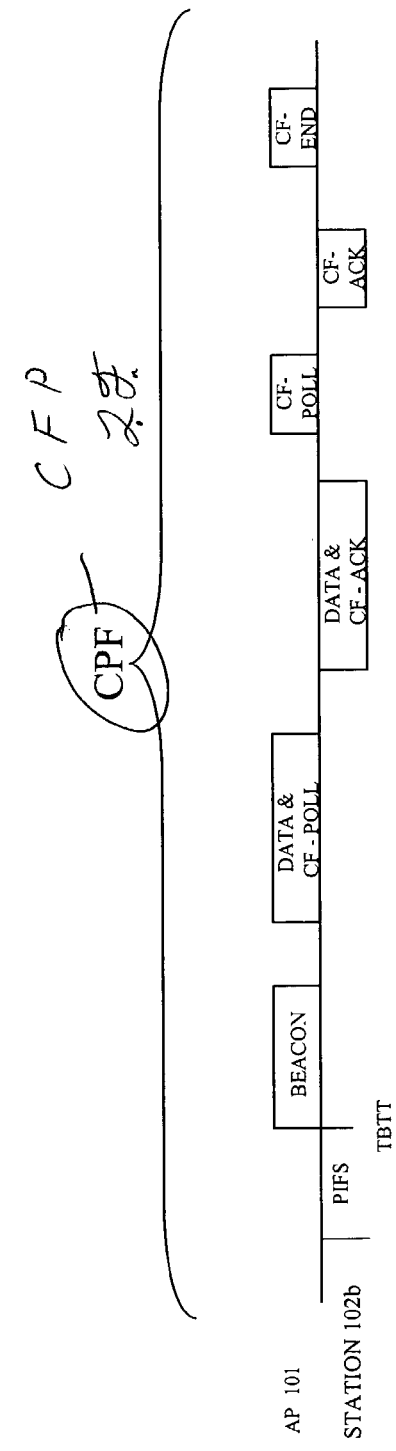
FIG. 2B is a diagram of an exemplary Point Coordination Function (PCF) access across the wireless medium shown in FIG. 1.

The 802.11 standard also defines a Point Coordination Function (PCF), which supports the execution of time-bounded data exchanges. PCF accesses are normally performed during the Contention Free Period (CFP), an example of which is shown in FIG. 2B. Typically, CFPs and CPs alternate in time. PCF accesses are more advantageous when the traffic on the shared medium is relatively predictable. However, PCF accesses are not necessarily the most efficient type of accesses for the exchange of burst traffic.

In the case of PCF accesses, a Point Coordinator (PC), typically part of AP 101, coordinates PCF communications. During the CFP, PCF accesses are made to shared medium 103 while basic DCF accesses are still made during the CP period.

Generally, during a CFP, the PC within AP 101 sends a combination poll and data frame to a target station 102b (the DATA & CF-POLL frame in FIG. 2B). A beacon frame BEACON maintains synchronization. Upon successful polling and receipt of the data from the PC, the target station 102b acknowledges a successful transmission with data and an acknowledge frame (the DATA & CF ACK frame in FIG. 2B). On the other hand, if the target station 102b does not acknowledge after the expiration of a PCF Interframe Space (PIFS), the PC polls one or more other stations or terminates the CFP (in FIG. 2B, the CFP is terminated with a CF-END frame). All deferring stations 102*c,d* . . . N set their NAVs and hold-off. In FIG. 2B, AP 101 is exchanging data with station 102*b*, and station 102N is deferring.

Figure 3:
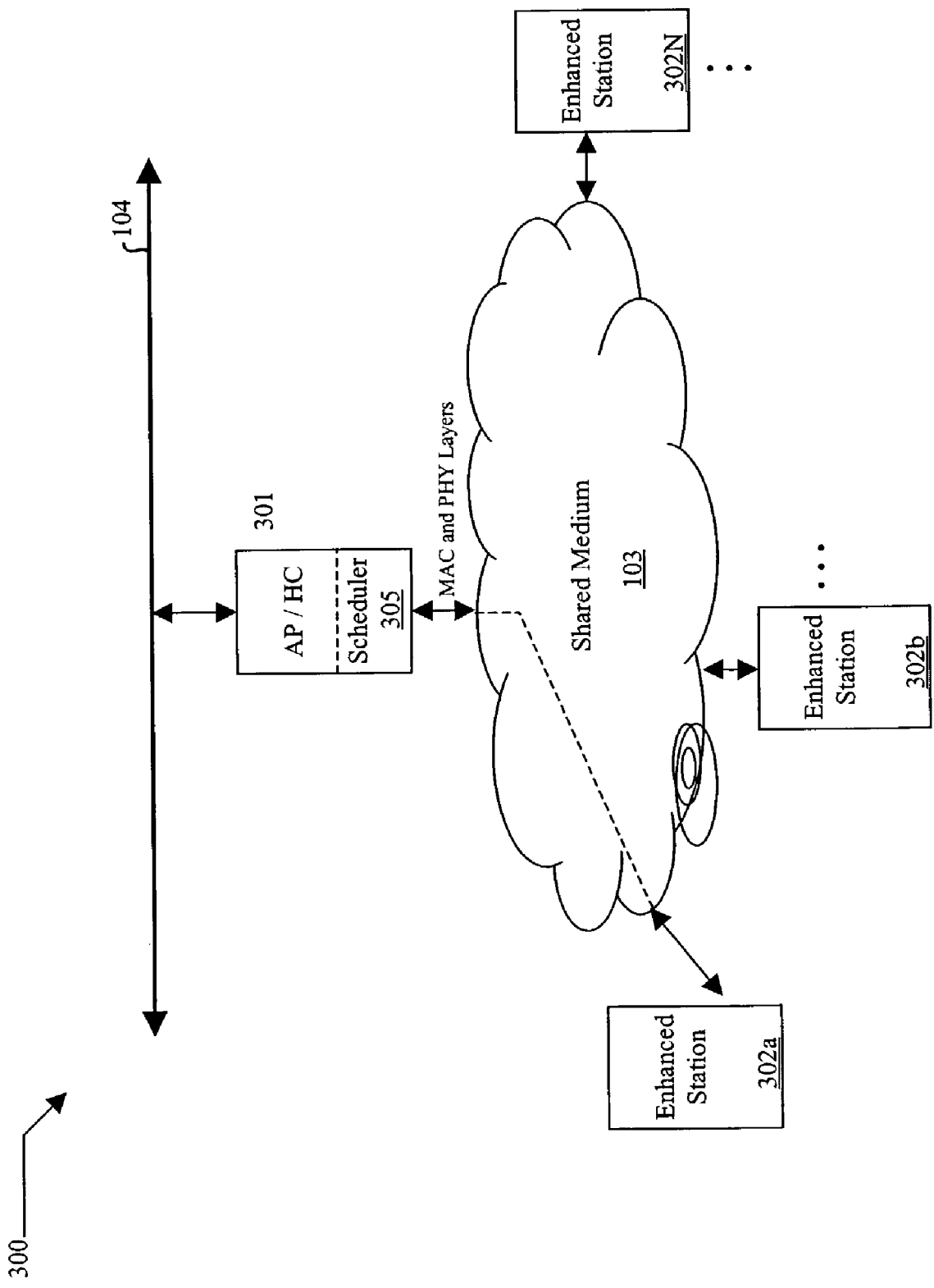
FIG. 3 is a high level block diagram of a representative enhanced BSS or QBSS for Quality of Service (QoS) WLAN communications in accordance with draft supplemental standard ANSI/IEEE Std. 802.11e.

Draft supplemental standard ANSI/IEEE Std. 802.11e ("the 802.11e standard") defines an enhanced MAC protocol for WLANs. As illustrated in FIG. 3, under the 802.11e standard, an enhanced BSS is designated as QBSS 300. AP/PC 101 becomes an AP/Hybrid Coordinator (AP/HC) 301, and the stations are designated at Enhanced Stations 302*a,b* . . . N.

Data are transmitted as superframes. Each superframe includes a beacon (B), a polling frame, CFP, and CP phases, and an end of CFP flag (E). The beacons maintain synchronization and carry protocol parameters. Enhanced DCF (EDCF) accesses take place during the CP phase, and Hybrid Coordination Function (HCF) accesses are performed during either the CFP or CP phases.

Data are transmitted on medium 103 during Transmission Opportunities (TXOPs) selectively allocated to enhanced stations 302*a,b* . . . N. A TXOP is a time period defined by starting time and maximum duration parameters during which a station 302*a,b* . . . N receiving a TXOP allocation is allowed to initiate transmissions of multiple MPDUs. TXOPs are allocated via contention during EDCF accesses and by polling during HCF accesses.

Enhanced stations 302*a,b* . . . N support multiple transmission queues (virtual stations), which prioritize data by Traffic Categories (TCs) based on QoS parameters. During the CP, each TC within a given enhanced station 302*a,b* . . . N contends for a TXOP by detecting a channel idle condition for an Arbitration Interframe Space (AIFS) period, which has a minimum value equal to the DIFS and thereafter counting down from a corresponding independent random backoff counter value. If the backoff counters for two or more TCs within the enhanced station 302*a,b* . . . N reach zero simultaneously, a virtual collision within that enhanced station 302*a,b* . . . N will occur. Virtual collisions are resolved by an enhanced-station internal scheduler, which grants the TXOP to the TC in accordance with an algorithm similar to that used to determine access to the shared medium. A TC with a higher priority typically has a higher probability of being allocated the next available TXOP. (Resolution of virtual collisions is independent of resolution of collisions between different enhanced stations 302*a,b* . . . N on the shared medium).

The 802.11e standard also provides for controlled contention resolution. Generally, controlled contention allows AP/HC 301 to determine the times and durations for polling given enhanced stations 302*a,b* . . . N based on information periodically updated by those stations. Consequently, stations 302*a,b* . . . N are allowed to request allocation of polled TXOPs.

In both hard-wired LANs and WLANs, data are normally transmitted over the shared medium as physical packets, which include the data payload and associated control fields. The time overhead required to transmit each physical packet therefore not only includes the time required to transmit the data payload but also the time required to transmit all of the associated control fields. Often the time overhead for transmitting the control fields exceeds the time required to transmit the data payload. In addition, some time overhead is required during each transmission event for the transmitting station to secure the right to transmit on the shared medium. In sum, the total time overhead required for a terminal to transmit multiple queued packets in a conventional network is relatively substantial.

According to the inventive principles, data are partitioned into multiple virtual packets which are then consolidated into a single physical packet such that the overhead required for transmitting control fields is only expended once per the physical packet. In other words, the control field overhead is amortized over all the virtual packets carried by the associated physical packet. The inventive principles are applied to both hard-wired and wireless LANs, including WLANs 100 and 300 described above. For purposes of discussion, the inventive principles will be described using system 300 of FIG. 3 for context. Thus, in system 300 of FIG. 3, a given station 302*a, b* . . . N, which has secured the right to transmit across shared medium 103, sends one virtual packet after another virtual packet in one long burst, with no gaps or preambles between virtual packets, and only an abbreviated header and checksum for each virtual packet.

Figure 4:
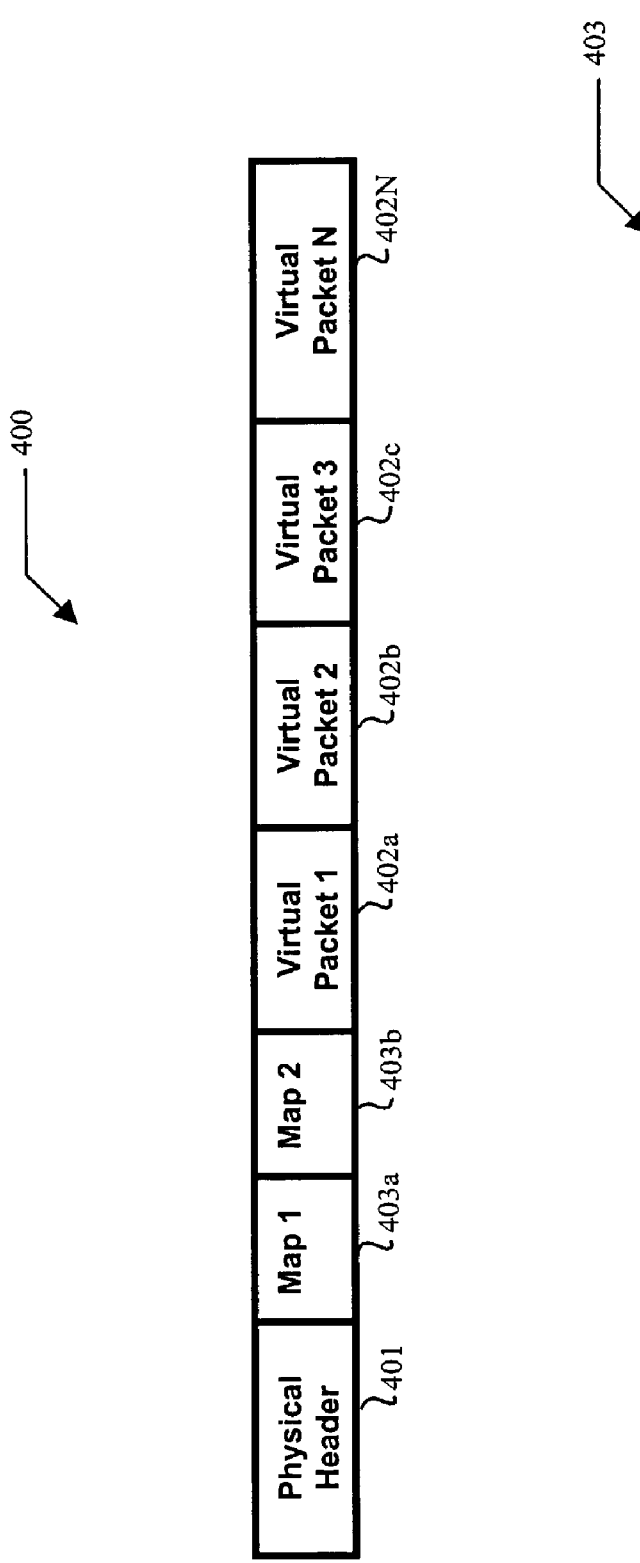
FIG. 4 is a diagram of an exemplary physical packet with multiple virtual packets and amortized control information according to one embodiment of the inventive principles.

FIG. 4 is a diagram of an exemplary physical packet 400 according to the inventive principles and includes the following fields. Physical header 401 is in accordance with the LAN or WLAN protocol applicable to the overall system, that is in this example a 802.11 standard MAC header calling for the transmission of a data packet from the transmitting station 302*a, b* . . . N back to itself. Any conventional 802.11 standard compliant stations 302*a, b* . . . N receiving packet 400 do not attempt to decode packet 400 except to determine the time duration of packet 400 during which these conventional stations 302*a,b* . . . N will not attempt to transmit across shared medium 103. Additionally, physical packet 400 does not include an overall checksum field; therefore, conventional 802.11 standard stations 302*a, b* . . . N will otherwise interpret physical packet 400 as being an error. The same principles are able to be implemented in alternate embodiments by inserting another "well known" target address or other information within header 401 which stations 302*a, b* . . . N embodying the present inventive principles decode but which are generally not decoded by legacy devices which ignore packet 400.

Exemplary physical packet 400 includes four exemplary virtual packets 402*a,b* . . . N, each containing a fragment of a larger data unit and a conventional checksum. Virtual packets 402*a,b* . . . N are analogous to MAC Protocol Data Units (MPDUs) which carry data handed-down from the MAC Service Data Units (MSDUs) from the higher layers of the protocol stack under which stations 302*a, b* . . . N operate. In practical implementations, the actual number of virtual packets 402*a,b* . . . N per physical packet 400 is much greater than the four examples shown in FIG. 4 for illustrative purposes.

Packet 400 further includes a selected number of identical map fields (maps), of which two maps 403*a*-403*b* are shown in FIG. 4 for illustrative purposes. The number of maps 403*a*-403*b* will vary depending on the transmission environment. For example, in a low noise environment, only one map may be required while in a very noisy transmission environment, three or four maps may be required. The optimum number of maps 403*a*-403*b* utilized per physical packet 400 is generally a tradeoff between the impact of adding redundant maps 403*a*-403*b* to packet 400 and the impact of losing the entire physical packet 400 when mapping is not possible.

Figure 5:
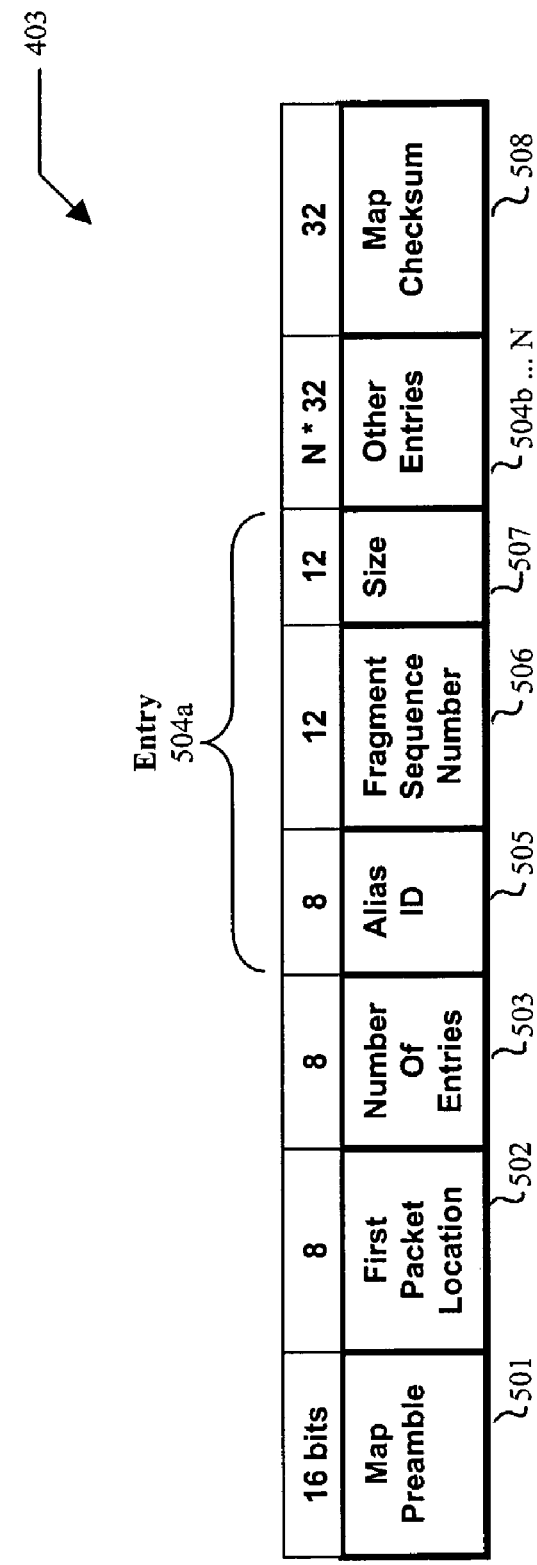
FIG. 5 is a diagram of an exemplary embodiment of the map field shown in FIG. 4 according to one embodiment of the inventive principles.

FIG. 5 is a diagram of an exemplary map 403, such as map 403*a*-403*b* in FIG. 4 which contains the following fields. For illustration purposes, the fields shown in FIG. 5 are for an 802.11e wireless network, although the underlying concepts may be adapted to other hard-wired and wireless networks.

Map preamble 501 is a 16-bit fixed pattern utilized to facilitate finding at least one map 403*a*-403*b* within physical packet 400, especially if first map 403*a* is corrupted. Furthermore, each entire map 403*a*-403*b* is a multiple of 32 bits, which also assists in locating another map if the first map 402*a* is corrupted.

First packet location field 502 indicates the location of the first byte of first virtual packet 402*a* in physical packet 400.

Number of entries field 503 indicates the number of entries 504a, b . . . N in each map 403a-403b, and hence the number of virtual packets 402a,b . . . N contained in physical packet 400 (e.g. each entry 504a, b . . . N describes one corresponding virtual packet 402a,b . . . N). Each entry has an alias ID field 505, a fragment sequence number field 506, and a size field 507.

The alias field 505 includes an alias to the intended station 302a, b . . . N, to which the associated virtual packet 402a,b . . . N is directed. The fragment sequence number field 506 includes an 8-bit MPDU (MAC layer protocol data unit) number and a 4-bit fragment number and allows virtual packets 402a,b . . . N (MPDUs) to reconstruct the corresponding MSDUs or similar higher-level data structures. Sequence number field 506 also allows virtual-packet retransmission in the event of an error. Size field 507 sets the size (width) of the corresponding virtual packet 402a,b . . . N and also its location within physical packet 400 (the location of a virtual packet 402a,b . . . N corresponds to the sum of the previous virtual packet sizes and the first packet location from field 502). If the window size is less than 128 MPDU out of a possible 256 MPDU, then no ambiguity ever exits between a new MPDU within the current window and any old MPDUs that were needlessly retransmitted. A 12-bit size field 506 is sufficient for the largest possible fragment in the illustrated embodiment.

Each map 403a-403b ends with a conventional 32-bit checksum field 508. Maps 403a-403b do not specify the format of a particular virtual packet 402a,b . . . N. A particular virtual packet 402a,b . . . N may have a checksum, may use FEC encoding, and/or may also be encrypted.

The virtual packets 402a,b . . . N in a given physical packet 400 may all go to the same station 302a, b . . . N or to different stations 302a, b . . . N within network 300. When all virtual packets 402a,b . . . N are sent to the same station 302a, b . . . N, the size of the virtual packet headers are advantageously minimized. Furthermore, a single virtual packet 402a,b . . . N is broadcast to multiple stations 302a, b . . . N. In other words, combinations of virtual packets 402a,b . . . N are able to be packed into physical packets 400 as required to minimize overhead.

One difficulty with sending large packets in most conventional packetized data system is an increased vulnerability to noise. For instance, if impulse noise occurs approximately once per millisecond and the transmission of a long packet requires three (3) milliseconds, the probability of an error-free transmission is low. If entire long packets have to be retransmitted many times to overcome transmission errors, the advantages of transmitting long packets are lost.

According to the inventive principles, data being sent from a given station 302a, b . . . N are divided into a large number of serially (sequentially) numbered virtual packets 402a,b . . . N. In turn, the receiving station 302a, b . . . N returns an acknowledge, such as the ACK frames discussed above in conjunction with FIG. 2A with respect to 802.11e compliant systems, upon the successful receipt of each virtual packet 402a,b . . . N. Preferably, entire physical packets 400 are not acknowledged, and the corresponding receiving station 302a, b . . . N only acknowledges virtual packets 402a,b . . . N addressed to it. Any virtual packets 402a,b . . . N, which are not successfully received, are retransmitted during the next long physical packet 400 transmitted by the corresponding transmitting stations 302a, b . . . N.

Advantageously, the overhead associated with each virtual packet 402a,b . . . N is very small compared to the overhead for physical packets 400. Therefore the virtual packet size is made very small when operating in a noisy environment. Consequently, virtual packet size is dynamically and optimally sized for maximizing throughput based on the noise across shared medium 103.

Each virtual packet 402a,b . . . N normally carries its own checksum. However, alternatively, forward error correction may be utilized. Furthermore, different virtual packets 402a,b . . . N within the same physical packets 400 but targeted to different receiving stations 303a, b . . . N can utilize different error correction schemes. Generally, error control and recovery at the virtual packet level are negotiated between terminals 302a,b . . . N independent of the overall structure of the physical packets 400.

The principles of the present invention are applicable to systems in which the data rate across a shared medium, such as shared medium 103 of FIG. 3, is variable. For example, under supplemental standard 802.11a, the baud-rate is fixed at 250,000-baud but the data rate varies from 6 to 54 megabits. The variation in data rate results from OFDM coding and is able to be adjusted for optimum results. Hence, in embodiments of the present principles operating on 802.11a compliant data, the physical packet headers 401 of physical packets 400 (FIG. 4) for 802.11a data may be sent at the 6 megabits per second data rate. The remainder of each physical packet 400 may then contain some virtual packets 402a,b . . . N for a first station 302a, b . . . N sent at a first data rate, such as twelve megabits per second, and other virtual packets 404a,b . . . N for a second station 302a, b . . . N sent at a second data, such as fifty-four (54) megabits per second. Each station 302a, b . . . N then decodes the virtual packets 402a,b . . . N with the appropriate data rate and discards the virtual packets 402a, b . . . N which do not have the appropriate data rate.

In the typical networked system, the time allowed for transmission is usually fixed. For instance, in 802.11e compliant system 300, AP/HC 301 allocates TXOPs of a particular length, as discussed above. In order to best utilize each TXOP according to the present principles, the last virtual packet 402a,b . . . N, (e.g. virtual packet 402N), in the physical packet 400 may be a fragment of a larger data unit, with the fragment size chosen such that the transmission of the corresponding physical packet 400 will end concurrently with the end of the allocated TXOP.

A station 302a, b . . . N receiving a virtual packet 402a, b . . . N near the end of a physical packet 400 must be capable of determining the start and end of the virtual packet 402a, b . . . N, even if errors exist near the beginning of the physical packet 400. The well-known bit stuffing strategy used in HDLC will accomplish this task, but will cause the bit-stuffed data to no longer align on byte boundaries. Furthermore, this type of bit-stuffing results in an unpredictable increase in the length of the corresponding physical packet 400, which is unacceptable if physical packet 400 has been precisely sized to fit in a TXOP.

Alternatively, a predetermined bit pattern marks the beginning of each virtual packet 402a,b . . . N. If this bit pattern fortuitously occurs in the user data, a false indication is detected because the virtual packet 402a,b . . . N will not have a valid checksum. However, a virtual packet 402a,b . . . N with data that do contain many such patterns (possibly constructed by a malicious user) may overwhelm an out-of-synch decoder within the receiving stations 302a, b . . . N, since each possible packet header 401 would require calculation of the checksum. "Escaping" such a pattern by preceding it with an escape sequence, moreover, the length of the packet as with bit stuffing.

The principles of the present invention advantageously address the problems associated with HDLC bit stuffing and the use of predetermined bit patterns at the start of each virtual packet. Preferably, maps 403a-403b allow for synchronization of virtual packets 402a,b . . . N. Again, each map begins with the preamble field 501 containing a fixed bit pattern designating the start of the map, followed by a field 502 indicating the location of the first virtual packet 402a, and a field 503 indicating the number specifying the number of entries 504 in the map 403a-403b itself. A receiving station 302a, b . . . N reads at least one map 403a-403b to determine which portions of the corresponding physical packet 400 contain virtual packets 402a,b . . . N for that station 302a, b . . . N to decode. Station 302a, b . . . N ignores the remainder of the physical packet 400. Hence, a given station 302a, b . . . N only decodes a small amount of data and is therefore not overwhelmed by the need to scan large amounts of data destined for other stations 302a, b . . . N .

When two or more stations 302a, b . . . N alternate in transmitting long physical packets 400 to each other, the time required to repeat the pattern might exceed the latency requirements for some applications. To avoid such latency problems, virtual packets 402a,b . . . N are strategically placed within the physical packet 400, such as at the beginning, middle, and end of a very long physical packet 400. Bounds on the lengths of virtual packets 402a,b . . . N from other stations 302a, b . . . N may also be utilized to free bandwidth on shared medium 103.

While a particular embodiment of the invention has been shown and described, changes and modifications may be made therein without departing from the invention in its broader aspects, and, therefore, the aim in the appended claims is to cover all such changes and modifications as fall within the true spirit and scope of the invention.

What is claimed is:

1. A method of transmitting data in a networked system including a shared transmission medium, comprising:
generating a plurality of virtual packets each containing information for delivery to at least one selected terminal in the networked system via the shared medium;
generating a control field having control information for controlling the delivery of the virtual packets; and
forming a physical packet for transmission across the shared transmission medium, the physical packet including the control field and the plurality of virtual packets such that overhead associated with the control field and medium access is amortized over the plurality of virtual packets, the physical packet having a map field for allowing a receiving terminal to identify and decode only those virtual packets within the physical packets addressed to the receiving terminal and including a plurality of entries each controlling the delivery of a corresponding one of the virtual packets, each entry including a first field for identifying the selected terminal for delivery of the corresponding virtual packet, a second field indicating a size of the corresponding virtual packet, and a third field for reconstructing a larger data structure from the corresponding virtual packet.

2. The method of claim 1, wherein the control field comprises a preamble and a header.

3. The method of claim 1, wherein the map field further comprises:
a preamble for detecting the map field within the physical packet;
a fourth field indicating a number of entries in the map field; and
a fifth field indicating a location within the physical packet of a first virtual packet.

4. The method of claim 1, wherein each virtual packet further includes error correction information.

5. The method of claim 1, wherein the physical packet further comprises a header decodable by selected terminals on the network.

6. The method of claim 5, wherein the header comprises a standard packet header for transmitting a physical packet from a transmitting terminal to itself.

7. The method of claim 5, wherein the header comprises a standard packet header for transmitting a physical packet to a special address.

8. The method of claim 1, wherein forming the physical packet comprises forming the physical packet with a plurality of map fields, a number of the plurality of map fields selected in response to a noise level in the network.

9. The method of claim 1, further comprising selectively generating an acknowledge signal from the selected terminal in response to delivery of a corresponding set of correctly received virtual packets.

10. The method of claim 9, further comprising retransmitting a set of unacknowledged virtual packets in a second physical packet including a control field and a plurality of virtual packets.

11. The method of claim 1, further comprising transmitting the physical packet across the shared medium, first and second ones of the virtual packets within the physical packet being transmitted at respective first and second data rates.

12. A method of transmitting data across a shared medium comprising:
generating a data structure including a physical packet for carrying data across the shared transmission medium, the physical packet including a plurality of virtual packets carrying data payloads and at least one map field having control information for controlling the delivery of the virtual packets to selected terminals coupled to the shared medium such that a time overhead associated with the header, preamble and shared transmission medium access is amortized across the physical packet; and
generating the at least one map field for allowing a receiving terminal to identify and decode only those virtual packets within the physical packet addressed to the receiving terminal and including a plurality of entries each controlling the delivery of a corresponding one of the virtual packets, each entry including a first field for identifying the selected terminal for delivery of the corresponding virtual packet, a second field indicating a size of the corresponding virtual packet, and a third field for reconstructing a larger data structure from the corresponding virtual packet.

13. The method of claim 12, wherein generating the data structure comprises generating the data structure such that the physical packet further comprises a physical header decodable by substantially all the terminals coupled to the shared medium.

14. The method of claim 12, wherein generating the data structure comprises generating the data structure such that each virtual packet further includes an associated checksum field.

15. The method of claim 12, wherein generating the data structure comprises generating the data structure such that the physical packet further comprises a header.

16. The method of claim 12, wherein generating the data structure comprises generating the data structure such that the physical packet further comprises a preamble.

17. The method of claim 12, wherein generating the data structure comprises generating the data structure such that the virtual packets are distributed within the physical packet to minimize latency during delivery of virtual packets to the selected terminals.

18. The method of claim 12, wherein generating the data structure comprises generating the data structure such that the at least one map field comprises a plurality of map fields, a number of the plurality of map fields selected to increase detection of at least one map field in a noisy environment across the shared medium.

19. The method of claim 12, wherein generating the data structure comprises generating the data structure such that the at least one map field comprises:
- a preamble for detecting the map field;
- a field identifying a location of a reference virtual packet within the physical packet;
- a field identifying a number of virtual packets within the physical packet;
- an entry for delivering a corresponding virtual packet to a receiving terminal; and
- an error detection field.

20. A network, comprising:
- a shared medium; and
- a plurality of information processing terminals coupled to the shared medium, a first one of the terminals transmitting information to at least a second one of the terminals via the shared medium and operable to:
  - generate a plurality of virtual packets each containing information for delivery to the at least one second terminal;
  - generate a map field having control information for controlling the delivery of the virtual packets to at least one second terminal such that the second terminal identifies and decodes only data virtual packets addressed to the second terminal and, the map field including an entry for each of the plurality of virtual packets, wherein each entry includes first field for identifying the at least one second terminal, a second field indicating a size of the corresponding virtual packet; and a third field for reconstructing a larger data structure from the corresponding virtual packet; and
  - form a physical packet for transmission across the shared transmission medium to at least one second terminal, the physical packet including the map field and the plurality of virtual packets such that overhead associated with the physical packet is amortized over the plurality of virtual packets.

21. The network of claim 20, wherein the shared medium comprises a hard-wired infrastructure.

22. The network of claim 20, wherein the shared medium comprises a wireless transmission medium.

23. The network of claim 20, wherein at least a portion of the network complies with ANSI/IEEE Std. 802.11 and selected enhancements thereto.

24. A method of communicating in a shared medium system, comprising:
- generating a plurality of virtual packets each containing information for transmission;
- generating associated control information including a map field portion having an entry corresponding to each of the plurality of virtual packets, wherein each entry includes a first field for identifying at least one terminal, a second field indicating a size of the corresponding virtual packet, and a third field for reconstructing a larger data structure from the corresponding virtual packet, wherein the map field portion allows a receiving terminal to identify and decode only those virtual packets addressed to the receiving terminal and;
- transmitting a physical packet including the plurality of virtual packets and the associated control information;
- receiving the physical packet at a plurality of terminals communicating via the shared medium;
- decoding the associated control information at a selected one of the terminals; and
- processing at least one of the plurality of virtual packets at the selected one of the terminals in accordance with the associated control information.

25. The method of claim 24, further comprising discarding the physical packet at a second selected one of the terminals not operable to decode the associated control information.

26. The method of claim 25, wherein the selected one of the terminals is operable to decode a header portion of the associated control information and the second selected one of the terminals is inoperable to decode the header portion of the associated control information.

27. The method of claim 24, further comprising acknowledging receipt of each of at least one of the virtual packets by the selected one of the terminals.

28. The method of claim 24, wherein the selected one of the terminals processes at least one of the plurality of virtual packets having a corresponding data rate.

29. The method of claim 24, wherein the selected one of the terminals is operable to decode the map field portion of the associated control information to identify at least one of the virtual packets.

* * * * *